(12) United States Patent
Metz et al.

(10) Patent No.: US 6,913,641 B2
(45) Date of Patent: Jul. 5, 2005

(54) LAKED MONOAZO PIGMENTS BASED ON NAPHTHOLSULFONIC ACIDS

(75) Inventors: Hans Joachim Metz, Darmstadt (DE); Uday T. Nabar, Mumbai (IN); Frank Morgenroth, Maintal (DE); Chandrashekhar D. Patil, Maharashtra (IN); Sunil D. Deval, Mumbai (IN)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 10/476,775

(22) PCT Filed: Apr. 27, 2002

(86) PCT No.: PCT/EP02/04696

§ 371 (c)(1),
(2), (4) Date: Nov. 5, 2003

(87) PCT Pub. No.: WO02/090444

PCT Pub. Date: Nov. 14, 2002

(65) Prior Publication Data

US 2004/0139880 A1 Jul. 22, 2004

(30) Foreign Application Priority Data

May 9, 2001 (DE) ......................................... 101 22 374

(51) Int. Cl.[7] .............................................. C09B 63/00
(52) U.S. Cl. ....................... 106/402; 106/31.8; 106/496; 47/57.6; 430/108.23; 524/159; 524/190; 534/581; 534/602; 534/724
(58) Field of Search ............................... 106/31.8, 402, 106/496; 47/57.6; 430/108.23; 524/159, 190; 534/581, 602, 724

(56) References Cited

U.S. PATENT DOCUMENTS

| | | | | |
|---|---|---|---|---|
| 4,711,674 A | * | 12/1987 | Ando et al. | 106/402 |
| 4,810,302 A | * | 3/1989 | Funatsu et al. | 106/402 |
| 5,102,466 A | * | 4/1992 | Mordente et al. | 106/496 |
| 5,677,435 A | * | 10/1997 | Bindra | 534/883 |
| 5,869,625 A | * | 2/1999 | Jaffe et al. | 8/639 |
| 6,375,733 B1 | | 4/2002 | Bindra | 106/496 |
| 2004/0198964 A1 | | 10/2004 | Metz et al. | 534/724 |

FOREIGN PATENT DOCUMENTS

| | | | |
|---|---|---|---|
| DE | 141257 | 10/1902 | |
| DE | 175828 | 7/1905 | |
| EP | 000445072 A2 * | 9/1991 | ........... C09B/63/00 |
| EP | 000445342 A1 * | 9/1991 | ........... A61K/7/021 |
| EP | 001038925 A2 * | 9/2000 | ........... C09B/67/22 |
| EP | DE010139826 A1 * | 2/2003 | ........... C09B/29/15 |
| GB | 693598 | 7/1905 | |
| JP | 50-24988 | 8/1975 | |
| JP | 08302232 A * | 11/1996 | ........... C09B/67/48 |
| JP | 09194752 A * | 7/1997 | ........... C09B/67/48 |
| JP | 09227791 A * | 9/1997 | ........... C09B/67/48 |
| JP | 09241524 A * | 9/1997 | ........... C09B/67/48 |
| JP | 09268259 A * | 10/1997 | ........... C09B/63/00 |
| WO | WO 02/18497 | 3/2002 | |

OTHER PUBLICATIONS

Oakes et al., "Kinetic Investigations of the Oxidation of Arylazonaphthol dyes in hypochlorite solutions as a function of pH, " J. Chem. Soc., Perkin Trans. 2, pp. 2201–2206, 1998. (no month).

* cited by examiner

*Primary Examiner*—Anthony J. Green
(74) *Attorney, Agent, or Firm*—Anthony A. Bisulca

(57) ABSTRACT

The invention relates to novel monoazo compounds of formula (1), wherein R represents H or Cl, $M^{2+}$ represents $Ca^{2+}$ or $SR^{2+}$ and $Y_1$=H and $Y_2$=$SO_3^-$ or $Y_1$=$SO_3^-$ and $Y_2$=H. The compounds of formula (1) are characterized by their high drying power and high light-fastness.

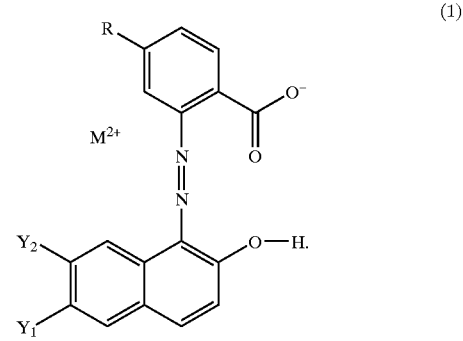

(1)

7 Claims, No Drawings

LAKED MONOAZO PIGMENTS BASED ON NAPHTHOLSULFONIC ACIDS

The present invention relates to novel laked azo pigments based on naphtholsulfonic acids and a process for preparing them.

Laked monoazo pigments from the series of the naphtholsulfonic acids are known in principle, for example as Pigment Yellow 104, P. Orange 19, P. Red 60, 66 and 67. They are used in inks, including printing inks, and for coloration of plastics. But it is also known that these pigments have poor fastness properties, namely poor lightfastnesses and also insufficient color strengths.

Colorants of the aforementioned type that have improved fastness properties were described for example in Japanese examined publication 50-24988 or WO 98/13425. However, the pigments described therein do not have both high lightfastnesses and high color strengths.

It is an object of the present invention to provide laked yellow to red azo pigments which have both high lightfastnesses and high color strengths.

We have found that this object is achieved, surprisingly, by laked monoazo pigments having the substitution pattern of the present invention.

The present invention accordingly provides compounds of the formula (1)

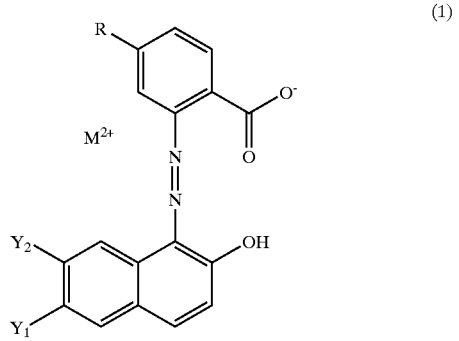

where

R is H or Cl,
$M^{2+}$ is $Ca^{2+}$ or $Sr^{2+}$,
$Y_1$ is H and $Y_2$ is $SO_3^-$; or $Y_1$ is $SO_3^-$ and $Y_2$ is H.

Preferred compounds for the purposes of the present invention are:

compound (1a) where R=H, $M^{2+}=Sr^{2+}$, $Y_1=SO_3^-$ and $Y_2$=H;
compound (1b) where R=Cl; $M^{2+}=Sr^{2+}$, $Y_1=SO_3^-$ and $Y_2$=H;
compound (1c) where R=Cl; $M^{2+}=Ca^{2+}$, $Y_1=SO_3$ and $Y_2$=H;
compound (1d) where R=H; $M^{2+}=Sr^{2+}$, $Y_1$=H and $Y_2=SO_3^-$.

Compound (1 b) is particularly preferred.

The pigments of the present invention are preparable by diazotization of anthranilic acid or 4-chloroanthranilic acid, subsequent coupling with a naphtholsulfonic acid of the formula (2)

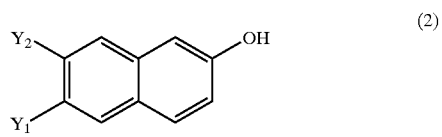

and laking with a calcium or strontium salt.

The diazotization reaction is suitably carried out with alkali metal nitrites or the alkyl nitrites of short-chain alkanes together with sufficiently strong mineral acids. Sodium nitrite and hydrochloric acid are particularly suitable. The reaction can be carried out in a temperature range of −5° C. to +30° C., preferably between 0° C. and 10° C. Although not necessary, the diazotization can be carried out in the presence of nonionic, anionic or cationic surface-active substances. It is optionally also possible to use other auxiliaries, such as natural or synthetic resins or resin derivatives.

The naphtholsulfonic acids of the formula (2), namely 2-hydroxynaphthalene-6-sulfonic acid (Schäffer's acid) and 2-hydroxynaphthalene-7-sulfonic acid (F-acid), can be used as free acids or as salts, such as alkali metal or ammonium salts for example. Coupling is possible by the direct or indirect method, but preferably is carried out directly, i.e., the diazonium salt is added to the initially charged coupling component. The coupling reaction can be carried out in a temperature range between −5° C. and 80° C., preferably between 5° C. and 25° C., and at a pH between pH 4 and pH 14, especially between pH 9 and pH 12. Like the diazotization reaction, the coupling can be carried out in the presence of surface-active substances, resins and also resin derivatives or customary additives. In general, the coupling component is used in a small excess over the diazonium compound, and preferably 1 equivalent of diazo component is reacted with 1.02 to 1.10 equivalents of the coupling components.

The addition of alkali-soluble resinous auxiliaries or mixtures thereof during or after coupling and also before or during laking improves pigment dispersibility. Advantageously, the resinous auxiliaries or mixtures thereof are used in the form of their aqueous alkaline solutions. Useful resinous auxiliaries include natural and synthetic resins. Rosin, disproportionated or hydrogenated rosin and also rosin derivatives are advantageous. Preference is given to natural resin acids, such as abietic acid, dihydroabietic acid, tetrahydroabietic acid, laevopimaric acid, dextropimaric acid and isodextropimaric acid, as present in commercially available rosin varieties. Particular preference is given to the commercially available resin Rosin N, which contains the resin acids abietic acid, dehydroabetic acid, neoabietic acid, palustric acid, isopimaric acid, pimaric acid and sandaracopimaric acid, or to a commercial product which is equivalent to Rosin N. As well as the enumerated resins and their derivatives it is also possible to use alkyd resins or synthetic hydrocarbon resins having a high acid number. The resins mentioned are preferably added to the reaction mixture following the coupling reaction.

The coupling products prepared are laked by adding calcium or strontium salts or aqueous solutions thereof. Preference is given to using an aqueous solution of one of the metal salts mentioned. Examples of suitable metal salts are calcium chloride, calcium nitrate, strontium chloride and strontium nitrate, aqueous metal salt solutions of calcium chloride or strontium chloride being particularly suitable. The laking advantageously takes place at a temperature between 25 and 80° C. and preferably between 50 and 60° C.

After laking, the compounds of the present invention are preferably subjected to a heat treatment in an aqueous, aqueous-organic or organic medium at temperatures between 80 and 200° C., under atmospheric or superatmospheric pressure, and advantageously for 1 to 6 hours, especially in the presence of the aforementioned resinous auxiliaries. The pigment suspensions obtained can subsequently be filtered in the usual way and the presscake washed salt-free with water, dried and ground.

The compounds of the formula (1) are useful for pigmenting macromolecular organic materials of natural or synthetic origin, for example plastics, resins, varnishes, paints or electrophotographic toners and developers, and also inks including printing inks.

Macromolecular organic materials pigmentable with the compounds of the present invention include for example cellulose ethers and esters, such as ethylcellulose, nitrocellulose, cellulose acetate or cellulose butyrate, natural resins or synthetic resins, such as addition polymerization resins or condensation resins, for example amino resins, especially urea- and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylic esters, polyamides, polyurethanes or polyesters, rubber, casein, silicone and silicone resins, individually or in mixtures.

It is immaterial in this connection whether the macromolecular organic compounds mentioned are present as plastically deformable masses, melts or in the form of dopes, varnishes, paints or printing inks. Depending on the intended use, it will be advantageous to use the compounds of the present invention as a blend or in the form of preparations or dispersions. Based on the macromolecular organic material to be pigmented, the compounds of the present invention are used in an amount of 0.05% to 30% by weight and preferably 0.1% bis 15% by weight.

The compounds of the present invention are also useful as colorants in electrophotographic toners and developers, such as for example one- or two-component powder toners (also known as one- or two-component developers), magnetic toners, liquid toners, addition polymerization toners and also specialty toners.

Typical toner binders are addition polymerization, polyaddition and polycondensation resins, such as styrene, styrene acrylate, styrene butadiene, acrylate, polyester, phenolepoxy resins, polysulfones, polyurethanes, individually or in combination, and also polyethylene and polypropylene, which may each contain further ingredients, such as charge control agents, waxes or flow auxiliaries, or may be subsequently modified with these additives.

Furthermore, the compounds of the present invention are useful as colorants in powders and powder coatings, especially in triboelectrically or electrokinetically sprayable powder coatings used for surface coating of objects composed for example of metal, wood, plastic, glass, ceramic, concrete, textile material, paper or rubber.

Powder coating resins used are typically epoxy resins, carboxyl- and hydroxyl-containing polyester resins, polyurethane and acrylic resins together with customary hardeners. Combinations of resins are also used. For instance, epoxy resins are frequently used in combination with carboxyl- and hydroxyl-containing polyester resins. Typical hardener components (depending on the resin system) are for example acid anhydrides, imidazoles and also dicyandiamide and derivatives thereof, blocked isocyanates, bisacylurethanes, phenolic and melamine resins, triglycidyl isocyanurates, oxazolines and dicarboxylic acids.

The compounds of the present invention are also useful as colorants in ink-jet inks based on aqueous and nonaqueous systems and also in such inks which are processed according to the hot-melt process.

The compounds of the present invention are further useful as colorants for color filters not only for additive but also for subtractive color generation.

To evaluate the coating properties of the pigments prepared according to the invention, a selection was made, from among the multiplicity of known varnishes, of an alkydmelamine (AM) resin varnish containing aromatic components and based on a medium-oil, nondrying alkyd resin. To evaluate the plastics properties of the pigments prepared according to the invention, polyethylene and plasticized polyvinyl chloride were selected from the multiplicity of known plastics.

The pigments of the present invention are notable for excellent fastness properties; more particularly, they have both high lightfastnesses and high color strengths. They do not contain any environmentally unsafe heavy metals. The properties mentioned qualify the pigments of the present invention for use in particular as colorants in the printing sector (especially solventborne printing inks, production of ink-jet inks) and also for use in varnishes and in plastics, color filters, toners and for coloration of seed.

Parts in the inventive and comparative examples which follow are by weight.

INVENTIVE EXAMPLE 1 a) Preparation of Rosin N Solution

To 4000 parts of water add 88 parts of an aqueous sodium hydroxide solution (40% w/w) and heat to 90° C. Add 800 parts of solid Rosin N (from Dujadwala and Company, Mumbai, India) a little at a time in the course of about 1 hour.

Then heat to the boil for about 30 minutes until a solution is obtained and make up with water to a total amount of 8000 parts of Rosin N solution.

b) Diazotization

Suspend 51.5 parts of 4-chloroanthranilic acid in 350 parts of water, add 48.4 parts of aqueous sodium hydroxide solution (40% w/w) and stir until all the amine has dissolved. Cool the resultant solution to 10° C. and add 51.8 parts of aqueous sodium nitrite solution (40% w/w).

Charge 300 parts of water and 108.8 parts of hydrochloric acid (30 w/w) to a second vessel and add ice to cool to 5° C. Add the alkaline solution of 4-chloroanthranilic acid to the acid/ice initial charge dropwise at a temperature between 0 and 5° C. in the course of 10 to 15 minutes with stirring.

Add the sodium nitrite solution and stir at a temperature between 5 and 10° C. for 1 hour. Then destroy excess nitrite by adding sulfamic acid.

c) Coupling

Provide a mixture of 200 parts of water and 500 parts of ice as an initial charge. To this initial charge add with stirring 70.6 parts of 2-hydroxynaphthalene-6-sulfonic acid and then aqueous sodium hydroxide solution (40% w/w) to set a pH of 12 to 13. To the resultant solution add the diazonium salt of 4-chloroanthranilic acid from a) dropwise at a temperature between 5 and 10° C. in the course of 15 to 20 minutes and subsequently stir for 1 hour. Allow the temperature of the reaction mixture to rise from about 10° C. to about 20° C. during the subsequent stirring time. Once no diazonium compound and only traces of the coupling component are detectable, add 150 parts of the Rosin N solution prepared as per a) with stirring and stir for a further 10 to 15 minutes. Then adjust the pH with hydrochloric acid (10% w/w) to pH 5 to 6.

d) Laking

Heat the reaction mixture to 55° C. At this temperature, add a solution of 95.1 parts of strontium chloride in 300 parts of water dropwise in the course of about 10 minutes and stir until laking is complete (about half an hour).

e) Aftertreatment of Crude Pigment

After laking, heat the pigment suspension to 125° C. in an autoclave in the course of an hour and stir at 125° C. for a further hour. Thereafter, allow to cool down to about 30° C. and filter the pigment off, before washing the filter cake salt-free with water.

Dry the filter cake and grind to obtain 144 parts of red pigment: compound (1 b).

INVENTIVE EXAMPLE 2 a) Preparation of Rosin N Solution

As described in Inventive Example 1.

b) Diazotization

Provide an initial charge of 41.1 parts of anthranilic acid and 360 parts of water and add 121.0 parts of hydrochloric acid (30% w/w) with stirring. Then cool to 2 to 5° C. by adding ice and add 62.2 parts of an aqueous sodium nitrite solution (40% w/w) dropwise in the course of 10 to 15 minutes. Then stir at 5° C. for an hour. Subsequently, destroy excess nitrite by adding sulfamic acid.

c) Coupling

Provide a mixture of 200 parts of water and 500 parts of ice as an initial charge. To this initial charge add with stirring 70.6 parts of 2-hydroxynaphthalene-6-sulfonic acid and then aqueous sodium hydroxide solution (40% w/w) to set a pH of 12 to 13. To the resultant solution add the diazonium salt of anthranilic acid dropwise at a temperature between 5 and 10° C. in the course of 15 to 20 minutes and subsequently stir for 1 hour. Allow the temperature of the reaction mixture to rise from about 10° C. to about 20° C. during the subsequent stirring time. Once no diazonium compound and only traces of the coupling component are detectable, add 150 parts of the Rosin N solution prepared as per a) with stirring and stir for a further 10 to 15 minutes. Then adjust the pH with hydrochloric acid (10% w/w) to pH 5 to 6.

d) Laking

Heat the reaction mixture to 55° C. At this temperature, add a solution of 95.1 parts of strontium chloride in 300 parts of water dropwise in the course of about 10 minutes and stir for a further two hours.

e) Aftertreatment

Adjust the resultant suspension of the crude pigment with hydrochloric acid (30% w/w) to pH 4.0, then heat to 95° C. over one hour and stir at 95° C. for a further hour. Thereafter, allow to cool down to about 30° C. and filter the pigment off, before washing the filter cake salt-free with water. Dry the filter cake and grind to obtain 138 parts of a red pigment: compound (1a).

INVENTIVE EXAMPLE 3

Proceed as in Inventive Example 1 except for the following two points:

1. For laking, use a solution of 66.6 parts of calcium chloride in 300 parts of water instead of the strontium chloride solution.
2. Aftertreat the resultant crude pigment not in an autoclave but as described in Inventive Example 2.

118 parts of an orange pigment are obtained as compound (1c).

INVENTIVE EXAMPLE 4

Repeat Inventive Example 2 but use 70.6 parts of 2-hydroxynaphthalene-7-sulfonic acid instead of 2-hydroxynaphthalene-6-sulfonic acid to obtain 124 parts of an orange pigment: compound (1d).

Comparative Examples 1 to 4

Comparative Example 1

Example 2 of WO 98/13425 is followed to couple 2-amino-5-chloro-4-methylbenzenesulfonic acid (CLT acid) onto the potassium salt of 2-hydroxynaphthalene-6-sulfonic acid (potassium salt of Schäffer's acid) and lake with strontium.

Comparative Example 2

Example 4 of WO 98/13425 is followed to couple 2-amino-5-chloro-4-ethylbenzenesulfonic acid (homo CLT acid) onto the potassium salt of 2-hydroxynaphthalene-6-sulfonic acid (potassium salt of Schäffer's acid) and lake with strontium.

Comparative Example 3

Example 1 of Japanese examined publication 50-24988 is followed to couple 4-aminotoluenesulfonic acid onto β-hydroxynaphthoic acid and lake with calcium chloride solution.

Comparative Example 4

Example 2 of Japanese examined publication 50-24988 is followed to couple 2-chloro-4-aminotoluene-5-sulfonic acid onto β-hydroxynaphthoic acid and lake with calcium chloride solution.

Performance Tests:

The pigment of Inventive Example 1 provides on incorporation into AM varnish a coating which is fast to overcoating, strong in color and high in lightfastness. The overcoating fastness is 5 on the 5 point "staining" gray scale of DIN 54002. See Table 1 for color strength and lightfastness.

TABLE 1

(Inventive Examples 1 to 4)*:

| Ex. | Amine: | Coupling component: | Color: | M | FST | LiE/VT | LiE/AH |
|---|---|---|---|---|---|---|---|
| 1 | 4-Chloroanthranilic acid | Schäffer's acid | red | $Sr^{2+}$ | 1:2.68 | 8 | 6 |
| 2 | Anthranilic acid | Schäffer's acid | red | $Sr^{2+}$ | 1:2.01 | 7 | 5 |
| 3 | 4-Chloroanthranilic acid | Schäffer's acid | orange | $Ca^{2+}$ | 1:2.81 | 8 | 6–7 |
| 4 | Anthranilic acid | F-acid | orange | $Sr^{2+}$ | 1:2.17 | 7 | 5–6 |

TABLE 2

(Comparative Examples 1 to 4)*:

| Ex. | Amine: | Coupling component: | Color: | M | FST | LiE/VT | LiE/AH |
|---|---|---|---|---|---|---|---|
| 1 | CLT acid | Schäffer's acid | orange | $Sr^{2+}$ | 1:1.92 | 6 | 4 |
| 2 | Homo CLT acid | Schäffer's acid | red | $Sr^{2+}$ | 1:1.96 | 6–7 | 3–4 |
| 3 | 4-Aminotoluene-sulfonic acid | beta-ortho-naphtholcarboxylic acid | red | $Ca^{2+}$ | 1:0.89 | 6 | 2–3 |
| 4 | 2-Chloro-4-amino-toluene-5-sulfonic acid | beta-ortho-naphtholcarboxylic acid | red | $Ca^{2+}$ | 1:1.40 | 6–7 | 3–4 |

*Legend to Tables 1 and 2:
M = metal cation
FST = color strength
LiE/VT = full-shade lightfastness
LiE/AH = reduction lightfastness Color strength (FST) indicates how many parts of $TiO_2$ are needed to adjust 1 part of color pigment to ⅓ standard depth of shade (DIN 53235): 1:x $TiO_2$.

Lightfastness was determined in full shade and in reduction against the 8 point blue scale on the lines of DIN 54003. "8" corresponds to the highest lightfastness, "1" to the lowest.

The pigment of Inventive Example 1 was used for coloring plasticized polyvinyl chloride and high density polyethylene. Colored specimens were produced in a conventional manner by rolling the components on a laboratory roll mill at a higher temperature (plasticized PVC: 130° C. and 160° C.; HDPE 155° C.). When the colored specimen in HDPE was subjected to a warpage test, no warpage was found for the pigment of Inventive Example 1 (warpage less than 0.5% at 280° C.).

Furthermore, the pigment of Inventive Example 1 was used to make a pigment preparation based on Licowax PE 520 in a conventional manner for extrusion with ®Hostalen GC 7260 polymer pellet on a commercial extruder and pelletization. The pellets obtained were subsequently processed on an injection molding machine at 200° C. to form droplet-shaped moldings 2.5 mm in thickness. The heat resistance of the pigment of Inventive Example 1 was determined in the DIN 53772 injection molding process. The pigment is heat resistant up to 280° C.

What is claimed is:
1. A compound of the general formula (1)

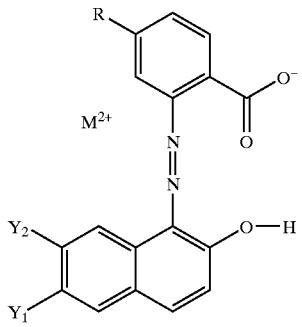

(1)

where
R is H or Cl,
$M^{2+}$ is $Ca^{2+}$ or $Sr^{2+}$,
$Y_1$ is H and $Y_2$ is $SO_3^-$ or $Y_1$ is $SO_3^-$ and $Y_2$ is H.
2. A compound as claimed in claim 1, wherein R is H, $M^{2+}$ is $Sr^{2+}$, $Y_1$ is $SO_3^-$ and $Y_2$ is H.
3. A compound as claimed in claim 1, wherein R is Cl; $M^{2+}$ is $Sr^{2+}$, $Y_1$ is $SO_3^-$ and $Y_2$ is H.
4. A compound as claimed in claim 1, wherein R is Cl; $M^{2+}$ is $Ca^{2+}$, $Y_1$ is $SO_3^-$ and $Y_2$ is H.
5. A compound as claimed in claim 1, wherein R is H; $M^{2+}$ is $Sr^{2+}$, $Y_1$ is H and $Y_2$ is $SO_3^-$.
6. A process for preparing a compound as claimed in claim 1, comprising the steps of diazotizing anthranilic acid or 4-chloroanthranilic acid, coupling the resultant diazonium salt with a naphtholsulfonic acid of the formula (2)

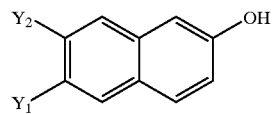

(2)

and laking the resultant monoazo compound with a calcium or strontium salt.

7. A pigmented composition comprising the compound as recited in claim 1, wherein the pigmented composition is selected from the group consisting of macromolecular organic materials, varnishes, paints, printing inks, electrophotographic toners and developers, powders, powder coatings, inks and colored seeds.

* * * * *